Patented June 12, 1945

2,378,140

UNITED STATES PATENT OFFICE 2,378,140

SYNTHETIC RUBBERLIKE MATERIALS COMPRISING BUTADIENE - 1,3 - INTERPOLYMERS

Herbert Gudgeon, Elias Isaacs, and William McGillivray Morgan, Blackley, Manchester, England, assignors to Imperial Chemical Industries Limited, a corporation of Great Britain No Drawing. Application October 14, 1942, Serial No. 462,000. In Great Britain July 4, 1941

4 Claims. (Cl. 260—92.7)

This invention relates to improvements in the manufacture and application of synthetic rubber-like materials. By the term "synthetic rubber-like materials" we refer to those products which have rubber-like properties, being plastic, capable of being milled, and which may be vulcanized to strong, elastic and highly distensible products, as more particularly illustrated by the examples hereinafter given.

According to the invention we manufacture synthetic rubber-like materials by interpolymerisation of a mixture in suitable proportions of at least two ingredients, one of which is butadinene-1:3 or 2-chlorobutadiene-1:3 or a methyl or dimethyl derivative of either and the other of which is a conjugated diene having chloro and cyano substituents, e. g., chlorocyanobutadiene-1:3 or a methyl homologue thereof. Also according to the invention we vulcanise the polymerised products obtained by the above process by subjecting them to a heat treatment in the presence of compounding ingredients.

It is known to make synthetic rubber-like materials by the polymerisation of various unsaturated aliphatic hydrocarbons or their derivatives, but the synthetic materials which have proved the most valuable are those made by polymerising butadiene-1:3 along with various other polymerisable substances including styrene, acrylic esters and acrylonitrile, and those made by polymerising chloroprene. Many of these kinds of rubber-like materials possess a very important advantage over natural rubber in that they are much less affected by oils and solvents. The highest resistance to oils and solvents is only obtained, however, at the sacrifice of other properties. We have now found that by interpolymerising 2-chlorobutadiene-1:3 or butadiene-1:3 with conjugated dienes having both chloro and cyano substituents rubber-like materials are obtained, which after vulcanisation have a resistance to oils and solvents as high as or higher than any previously obtainable, and which have also good working properties.

We have also found that these chlorocyano dienes interpolymerise with great readiness particularly with chloroprene. High yields of interpolymers are obtained and there is little or no loss nor special manipulation necessary for recovery due to unpolymerised chlorocyano dienes.

The proportions of the compounds of the mixture to be interpolymerised depend upon the nature of the particular compounds chosen, but in general the best products are made from mixtures containing less than 50% of the chlorocyano derivative.

When polymerisation, i. e., interpolymerisation is effected in aqueous emulsion, the aqueous emulsion may be obtained, for instance, by adding the requisite quantity of the substances to be polymerised and agitating. The emulsification and polymerisation can be conveniently effected in what may be regarded as a single technical operation, if the ingredients of the mixture are emulsified by agitating at the temperature at which polymerisation is to be effected and agitation then continued long enough for the necessary polymerisation to take place. The emulsification is suitably carried out by use of an emulsifying agent. Cetyltrimethylammonium bromide, cetyl p-dimethylaminobenzoate methosulphate, sodium cetyl sulphate, sodium isopropylnaphthalene sulphonate, and other salts derived from long chain bases and inorganic or organic acids or from organic acids of high molecular weight and inorganic bases are suitable emulsifying agents. Small proportions of one or more electrolytes, e. g., acetic acid, or acetic acid admixed with sodium acetate may be included in the mixture. Other ingredients may be included in the polymerisation mixture, namely, agents which are known to catalyse polymerisation such as organic and inorganic peroxides, and agents which modify the course of the polymerisation, for example carbon tetrachloride. When polymerisation is carried out in aqueous emulsion the products of polymerisation are produced in latex-like form. They may be obtained in massive form by coagulating the latex, removing the liquor and drying the curd. The coagulation may be effected by known methods, e. g., by freezing or by the addition of sodium chloride, sodium hydroxide or ethyl alcohol, depending upon the emulsifying agent which has been employed. Washing and drying may be effected on heated rollers on a rubber roller mill which is furnished with a device for washing.

The dry rubber-like material may be converted to products resembling vulcanised natural rubber by compounding and vulcanising. Compounding may be effected with, for example, filling and reinforcing ingredients such as carbon black and zinc oxide. Vulcanising may be effected by subjecting the material to a heat treatment, if desired, in the presence of sulphur and with natural rubber vulcanisation accelerators. The vulcanisates produced according to the present invention are much better than vulcanisates from natural rubber in their resistance to lubricating oils and hydrocarbon solvents.

The following examples, in which parts are by weight, illustrate but do not limit the invention.

Example 1

80 parts of 2-chlorobutadiene-1:3 and 20 parts of 2-chloro-1-cyanobutadiene-1:3 (the preparation of which is described below) are added to a solution of 8 parts of the sodium salts of sulphated sperm oil alcohols, 0.5 part of p-toluenesulphinic acid and 6 parts of glacial acetic acid in 400 parts of water. The whole is emulsified by rapid stirring and the temperature maintained at 20° C. External cooling is necessary as the copolymerisation proceeds exothermically. After one hour, 2 parts each of tetramethylthiuram disulphide and phenyl β-naphthylamine are added and the latex coagulated by stirring with 400 parts of saturated aqueous sodium chloride solution containing 150 parts of ethyl alcohol. The coagulum is washed and dried on a rubber roller mill. 91 parts of a rubber-like material are obtained.

2-chloro-1-cyanobutadiene-1:3 (B. P. 51–52° C./20 mm.) is prepared by pyrolysing α-chlorocrotonaldehyde cyanohydrin acetate under conditions similar to those used for making 1-cyanobutadiene-1:3 from crotonaldehyde cyanohydrin acetate, and described in Specification 520,272. α-Chlorocrotonaldehyde cyanohydrin acetate (B. P. 120–125° C./20 mm.) is prepared by acetylating α-chlorocrotonaldehyde cyanohydrin with acetic anhydride.

Example 2

The product obtained in Example 1 is included in the following mix:

| | Parts |
|---|---|
| Product of Example 1 | 100 |
| Light calcined magnesia | 10 |
| Wood rosin | 5 |
| Cottonseed oil | 5 |
| Channel black | 35 |
| Antioxidant (condensation product of acetaldehyde and α- and β-naphthylamines (see specification No. 280,661) | 2 |
| Sulphur | 1 |
| Zinc oxide | 10 |

The mix is cured at 141° C. for 1 hour. A vulcanisate is obtained which has the physical properties shown below. The physical properties of a vulcanisate made in a similar way from a similar mix containing 100 parts of neoprene (polymerised 2-chlorobutadiene-1:3) are given for comparison

| | Vulcanisate of Example 1 | Vulcanised neoprene |
|---|---|---|
| Maximum tensile strength kg./cm.² | 276 | 290 |
| Elongation at break | 400 | 660 |
| Resilience | 52.2 | 54 |
| Swelling in Diesel oil | 19 | 54 |

Example 3

An emulsification as described in Example 1 is carried out except that 20 parts of 3-chloro-1-cyanopentadiene-1:3 (prepared as described below) are used instead of 20 parts of 2-chloro-1-cyanobutadiene-1:3.

The polymerisation is carried out for 1½ hours at 20° C. and the product is isolated as in Example 1.

96 parts of a rubber-like product are obtained.

3-chloro-1-cyanopentadiene-1:3 (B. P. 95–97°/18 mm., $n_D^{20}$ 1.542) is made by decarboxylation of 3-chloro-1-cyanosorbic acid by warming in an equal weight of quinoline with a little copper powder. 3-chloro-1-cyanosorbic acid (M. P. 178–180° C.) is made by addition of α-chlorocrotonaldehyde to a 10% aqueous solution of sodium cyanoacetate at pH 10–12, and at a temperature of 3–8° C. After 20 minutes the reaction mixture is acidified, and the precipitated 3-chloro-1-cyanosorbic acid is filtered off and dried.

Example 4

The material prepared according to Example 3 is compounded and vulcanised as described in Example 2. The vulcanisate has the following physical properties.

| | |
|---|---|
| Maximum tensile strength kg./cm.² | 229 |
| Elongation at break | 760 |
| Swelling in Diesel oil | 26 |

Example 5

50 parts of butadiene-1:3, 25 parts of 2-chloro-1-cyanobutadiene-1:3, 3 parts of the sodium salts of sulphated sperm oil alcohols, 0.75 part of ammonium persulphate, 4.5 parts of 8% aqueous sodium hydroxide and 93 parts of water are agitated in a closed vessel at 45° C. for 48 hours. To the resultant latex there are added 1.5 parts of phenyl β-naphthylamine and the latex is then coagulated with a mixture of 100 parts of ethyl alcohol and 100 parts of a saturated aqueous solution of sodium chloride. The coagulated polymer is washed and dried on a rubber mill and 43 parts of a rubber-like material are obtained.

We claim:

1. A synthetic rubber-like material obtained by interpolymerization of a compound of the class consisting of butadiene-1,3, 2-chloro-butadiene-1,3 and their methyl and dimethyl homologues, and a compound of the class consisting of chlorocyano-butadiene-1,3 and its methyl homologues.

2. A synthetic rubber-like material obtained by interpolymerization of 2-chloro-butadiene-1,3 and 2-chloro-1-cyano-butadiene-1,3.

3. A synthetic rubber-like material obtained by interpolymerization of 2-chloro-butadiene-1,3 and 2-chloro-1-cyano-pentadiene-1,3.

4. A synthetic rubber-like material obtained by interpolymerization of butadiene-1,3 and 2-chloro-1-cyano-butadiene-1,3.

HERBERT GUDGEON.
ELIAS ISAACS.
WILLIAM McGILLIVRAY MORGAN.